(12) United States Patent
Biel, Jr. et al.

(10) Patent No.: US 11,362,381 B2
(45) Date of Patent: Jun. 14, 2022

(54) BATTERY BOX FOR AUTOMOTIVE BATTERY TEMPERATURE MANAGEMENT

(71) Applicants: CONSTELLIUM AUTOMOTIVE USA, LLC, Van Buren Township, MI (US); CONSTELLIUM SINGEN GMBH, Singen (DE)

(72) Inventors: John Peter Biel, Jr., Ann Arbor, MI (US); Weiling Wang, Livonia, MI (US); Nicolas Gorse, Ann Arbor, MI (US)

(73) Assignees: CONSTELLIUM AUTOMOTIVE USA, LLC, Van Buren Township, MI (US); CONSTELLIUM SINGEN GMBH, Singen (DE)

(*) Notice: Subject to any disclaimer, the term of this patent is extended or adjusted under 35 U.S.C. 154(b) by 457 days.

(21) Appl. No.: 16/332,591

(22) PCT Filed: Oct. 5, 2017

(86) PCT No.: PCT/EP2017/075428
§ 371 (c)(1),
(2) Date: Mar. 12, 2019

(87) PCT Pub. No.: WO2018/065554
PCT Pub. Date: Apr. 12, 2018

(65) Prior Publication Data
US 2021/0288361 A1    Sep. 16, 2021

Related U.S. Application Data

(60) Provisional application No. 62/405,318, filed on Oct. 7, 2016.

(51) Int. Cl.
*H01M 10/659* (2014.01)
*H01M 50/24* (2021.01)
(Continued)

(52) U.S. Cl.
CPC ....... *H01M 10/659* (2015.04); *H01M 50/207* (2021.01); *H01M 50/224* (2021.01); *H01M 50/24* (2021.01)

(58) Field of Classification Search
None
See application file for complete search history.

(56) References Cited

U.S. PATENT DOCUMENTS

2008/0233368 A1    9/2008  Hartmann et al.
2009/0109623 A1    4/2009  Jang et al.
(Continued)

FOREIGN PATENT DOCUMENTS

CN    102664292 A    9/2012
CN    103 762 395 A    12/2015
(Continued)

OTHER PUBLICATIONS

Yang et al. (CN 104900937) (a raw machine translation) (Abstract) (Sep. 9, 2015) (Year: 2015).*
Yang et al. (CN 104900937) (a raw machine translation) (Detailed Description) (Sep. 9, 2015) (Year: 2015).*
Yang et al. (CN 104900937) (a raw machine translation) (Drawings) (Sep. 9, 2015) (Year: 2015).*
(Continued)

*Primary Examiner* — Carmen V Lyles-Irving
(74) *Attorney, Agent, or Firm* — Ladas & Parry LLP; Malcolm J. MacDonald

(57) ABSTRACT

A battery box, supporting structure and insuring thermal management of one or more battery cells allowing a temperature control of said battery cells environment to insure its optimal operational condition, the battery box comprises at least one aluminum hollow profile, wherein said aluminium hollow profile comprises at least two chambers, wherein at least one chamber is filled with a first phase change material having a melting point $T1_F$ and at least one chamber is filled with a second phase change material having a melting point $T2_F$, where $T1_F > T2_F$.

16 Claims, 2 Drawing Sheets

(51) Int. Cl.
    *H01M 50/224*    (2021.01)
    *H01M 50/207*    (2021.01)

(56) References Cited

U.S. PATENT DOCUMENTS

| | | |
|---|---|---|
| 2012/0148881 A1 | 6/2012 | Quisenberry |
| 2012/0171523 A1 | 7/2012 | Yang et al. |
| 2013/0084487 A1 | 4/2013 | Kwak et al. |
| 2013/0266840 A1 | 10/2013 | Fujii et al. |
| 2014/0079978 A1* | 3/2014 | Al-Hallaj .......... H01M 10/6552 |
| | | 429/120 |
| 2014/0141311 A1* | 5/2014 | Michelitsch ...... H01M 10/0413 |
| | | 429/120 |
| 2016/0111761 A1 | 4/2016 | Kopra et al. |

FOREIGN PATENT DOCUMENTS

| | | |
|---|---|---|
| EP | 2 468 609 A2 | 6/2012 |
| EP | 2 607 815 A2 | 6/2013 |
| FR | 2 991 106 A1 | 11/2013 |
| WO | 2012/170691 A2 | 12/2012 |

OTHER PUBLICATIONS

International Search Report, dated Dec. 22, 2017, corresponding to Application No. PCT/EP2017/075428.
Chinese Office Action, dated Jun. 1, 2021, corresponding to Chinese Application No. 2017800606920.
Chinese Office Action, dated Feb. 23, 2022, corresponding to Chinese Application No. 2017800606920.

* cited by examiner

BATTERY BOX FOR AUTOMOTIVE BATTERY TEMPERATURE MANAGEMENT

FIELD OF THE INVENTION

The present invention relates to a battery box or battery pack enclosure, comprising at least one aluminum hollow profile filled with at least two different phase change materials. More particularly, the invention relates to a battery box capable of maintaining an optimal temperature range through phase changes by passive cooling or thermal buffering while meeting the mechanical crash management targets.

BACKGROUND

Development of electric powered vehicles present some challenges for auto-manufacturers. In particular, the housing of battery cells in the automotive implies specific considerations with regards for instance to tightness to prevent any leakages of electrolytes from battery cells, resistance to insure the integrity of battery cells in case of shock, thermal management or lightweight optimization. It can be insured by a battery box or battery pack or battery enclosure. Typically, a battery box for at least one electric battery comprises a floor or bottom plate and a frame which surrounds the electric battery. Preferentially, said battery box comprises a closure.

Battery cells should have to be protected from damages and shock. When being damaged it implies the change of the battery cells which is costly but can also lead to dangerous situations in case of short-circuits or electrolyte leakage.

Thermal management is also of major importance for a good performance of the electric powered vehicle. The operation life of rechargeable battery cells is significantly depending on the temperature of the battery cells during their operation life. In order to obtain a longest possible operation life for battery cells their operating temperature should be maintained within a certain temperature range during operation, typically between 5° C. to 70° C.

Recharging or discharging battery cells creates thermal energy which has to be conducted from the cells as effectively as possible to avoid too high temperatures, above 70° C. Further, in some situations it must be possible to warm up the battery cells in order to get them to a desired operating temperature, typically above 5° C.

A preferred temperature range for operating battery cells is a temperature range between 20° C. to 40° C.

US 20120148881 relates to a battery cooling battery box. The battery cooling battery box includes a battery array and a plurality of heat pipes. The heat pipes includes a profile extrusion having a plurality of hollow tubes formed therein. Each heat pipes includes an evaporator portion and a condenser portion. A heat transfer fluid is disposed within the plurality of hollow tubes. The evaporator portion is disposed between successive batteries within the battery array. The condenser portion is disposed outside of the battery array and exposed to a heat sink.

US 20160111761 discloses a battery box for packaging and thermal management of battery cells in a battery module. The battery module comprises at least one extruded aluminum or aluminum alloy profile provided with a plurality of thermal transfer fins arranged at a space from each other. A plurality of battery cells is mounted in said at least one profile in thermal contact with the thermal transfer fins. Thermal transfer medium is arranged in thermal contact with said at least one profile so that thermal energy is conducted through said aluminum or aluminum alloy profile (from/to the battery cells to/from said thermal transfer fluid.

EP2468609 discloses an energy absorbing and distributing side impact battery box for use with a vehicle, the battery box utilizing a battery pack enclosure that includes a plurality of cross-members that transverse the battery pack enclosure and absorb and distribute at least a portion of the load received when either the first or second side of the vehicle receives a side impact. The lumens within one or more of the cross-members may be unfilled or filled with a high melting temperature, low thermal conductivity material (e.g., fiberglass or similar materials). Alternately, the lumens within the cross-members may include a liquid (e.g., water), the liquid being either stagnant or flowing.

US20130084487 discloses a battery and battery box which improves a battery's heat dissipation capability by using an aluminum material and a phase change material capable of maintaining a suitable temperature through phase change according to a temperature in order to prevent a battery from being deteriorated in terms of performance. More specifically, battery box has a top case and a bottom case as a battery cell case for housing a battery cell. The top and bottom cases are adhered to each other, and either or both the top and bottom cases includes: a top sheet plate repeatedly undulated at predetermined intervals to form a plurality of unidirectionally extended convex parts to be filled with a phase change material; a bottom sheet plate formed in a flat shape and adhered to the top sheet plate; and a phase change material filled in between the convex parts and the bottom sheet plate.

SUMMARY OF THE INVENTION

The invention concerns battery box characterized by its ability to protect, support and thermal manage one or more battery cells allowing a temperature control of said battery cells environment to insure its optimal operational condition and on the use of at least two phase change materials (PCM) for thermal management. The invention consists in a battery box and the process for obtaining such battery box.

The battery box comprises at least one aluminium hollow profile with at least two chambers. In a preferred embodiment, said aluminium hollow profile with at least two chambers constitute the bottom plate of the battery box. In another preferred embodiment of the invention said aluminium hollow profile with at least two chambers constitute the frame of the battery box. Said aluminium hollow profile is preferably obtained by extrusion.

According to the invention, at least one chamber of said aluminium hollow profile is filled with a first phase change material having a melting point $T1_F$ and a second chamber is filled with a second phase change material having a melting point $T2_F$, where $T1_F > T2_F$. In a preferred embodiment, at least one chamber of said aluminium hollow profile is filled with a single first phase change material having a melting point $T1_F$ and a second chamber is filled with a single second phase change material having a melting point $T2_F$, where $T1_F > T2_F$.

A phase-change material (PCM) is a substance with a high heat of fusion which, melting and solidifying at a certain temperature, is capable of storing and releasing large amounts of energy. A PCM is characterized by its melting point TF. Heat is absorbed or released when the material changes from solid to liquid and vice versa; thus, PCMs are classified as latent heat storage (LHS) units.

When PCMs reach the temperature at which they change phase (their melting temperature) they absorb large amounts of heat at an almost constant temperature. The PCM continues to absorb heat without a significant rise in temperature until all the material is transformed to the liquid phase.

When the surrounding temperature decreases, typically when the temperature of battery cell decreases after the end of recharging period or after the car is shutdown, the PCM solidifies, releasing its stored latent heat. It permits to maintain the suitable storage temperature of the battery cell, which can prevent the battery cell from having deteriorated performance.

By using at least two PCMs in separate chambers, it permits to buffer the temperature evolution. It permits to slow down temperature increase during recharging or during the use of the battery cell, but also, prevents that the temperature in the environment of the battery cells falls too low by slowing down the temperature decreasing. At least two different PCMs are needed for the invention, but no limitation exists in the usage of PCMs. In a possible alternative of the invention, at least three different PCMs are used.

Said PCM are selected according to their respective temperature of melting which is chosen with regards to optimal operation condition of battery cells. In a preferred embodiment, single phase change material is used in a chamber. No mixture of phase change materials is preferred.

The difference between $T1_F$ and $T2_F$ is preferentially at least 5'C.

$T1_F$ is preferentially comprised between 25° C. and 70° C., more preferably between 25° C. and 40° C., and even more preferably between 30° C. and 40° C.

$T2_F$ is preferentially comprised between 5° C. and 30° C., more preferably between 15° C. and 30° C., and even more preferably between 25° C. and 30° C.

In a preferred embodiment, said aluminium hollow profile comprises at least three chambers. More preferably, said aluminium hollow profile comprises at least four, five, six, seven, eight, nine, ten, twenty, thirty chambers.

When aluminium hollow profile comprises at least 3 chambers, in a preferred embodiment, a third PCM, having a melting point $T3_F$ can be used. In that case, at least one chamber of said aluminium hollow profile is filled with a first phase change material having a melting point $T1_F$, at least one chamber is filled with a second phase change material having a melting point $T2_F$, and at least one chamber is filled with a third PCM having a melting point $T3_F$, where $T1_F > T3_F > T2_F$.

$T3_F$ is preferably comprised between 15° C. and 45° C.

In a preferred embodiment, all the chambers of the aluminium hollow profiled are filled with phase change materials.

The contact area of the phase change material with the aluminium hollow profile influences the thermal management efficiency. The contact area of the PCM with the aluminium hollow profile is represented by a developed surface area. Said developed surface area corresponds to the calculated interior perimeter of the chambers of the aluminium hollow profile multiplied by the length of the aluminium hollow profile. The length of the aluminium hollow profile is taken parallel to the profile direction. In case, where the aluminium hollow profile is preferably obtained by extrusion, the length is parallel to the extrusion direction. The interior perimeter of the chambers is measured considering a cross section perpendicular to the profile direction or the extrusion direction.

Due to the high thermal conductivity of aluminum, it is of interest to maximize this developed surface area to obtain the most rapid thermal response. The number of chambers filled with a PCM and their geometries are selected in order to obtain the best compromise between low extrusion density, high contact area, good crushability, high PCM volume and feasibility to produce (in particular speed for extrusion process).

The inventors found that a rapid thermal response of the battery box is obtained if the developed surface area of chambers is at least 1.5 times greater, preferably 2 times greater and more preferably 2.5 times greater than the surface area of a solid profile having the same geometry, i.e. with the same external dimensions. A solid profile is a profile with no chamber.

The developed surface area of the chambers can be maximized by applying a corrugated pattern, inside the chambers.

This corrugated pattern can play a role of thermal transfer fins, but presents an interest to be monobloc with the aluminium hollow profile: no need of assembly such as welding or cladding.

The inventor found that a chamber with a corrugated pattern with a developed surface increased by a factor of at least 1.2 compared to a chamber in which said corrugated pattern is inscribed into permits to obtain a more efficient thermal response without modifying the external dimensions of the aluminium hollow profile. This feature permits to obtain a better thermal management without modifying the weight of the battery box. The aluminium hollow profile with corrugated pattern is preferably obtained by extrusion.

The inventors found that the thermal management can be optimized if chambers are separated from the battery cell environment, i.e. from the interior of the battery box and/or from the outdoor environment (exterior of the battery box), by a wall having a thickness T of less than 2.5 mm, preferably less than 2.0 mm, and more preferably less than 1.5 mm. They also found that in a preferred embodiment, two juxtaposed chambers are separated by a distance R of at least 1.0, preferably 1.5 mm. In a preferred embodiment, the ratio between T/R is in the range of 0.8 to 1.6, preferably between 1 to 1.3. A second aim of the invention is the method permitting to obtain the battery box according to the invention. It comprises the following steps:

An aluminum profile is produces with at least two chambers. In a preferred embodiment, the profile is obtained by extrusion. At least two phase change materials are selected characterized by a melting point temperature $T1_F$ and $T2_F$, such as $T1_F > T2_F$. At least one chamber is filled with the phase material having a melting point temperature $T1_F$ and at least one other chamber with the phase material having a melting point temperature $T2_F$.

DESCRIPTION OF THE SPECIFIC EMBODIMENTS

Figure 1:
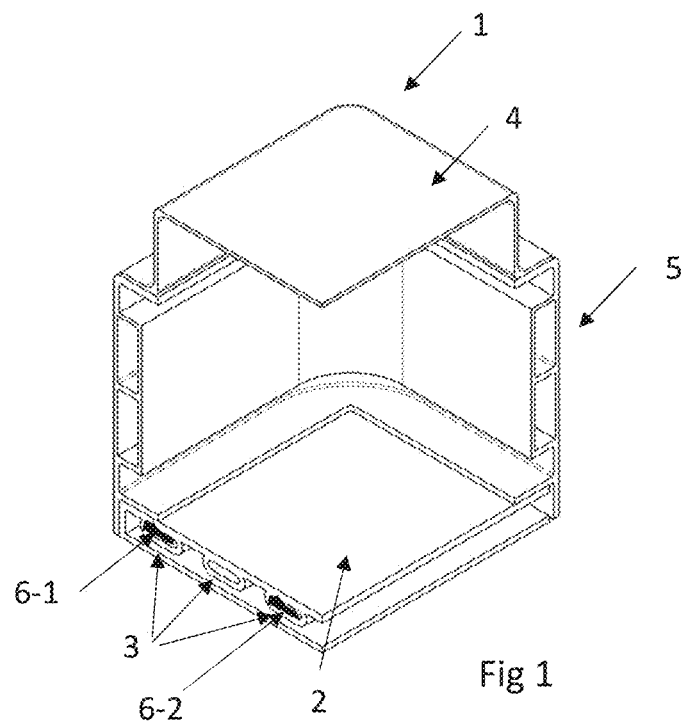
FIG. 1 is a perspective view of a part of a battery box.

FIG. 1 is a perspective view of a part of a battery box 1. The battery box 1 is constituted of a bottom plate 2, a frame 5 and a closure 4. On FIG. 1, the bottom plate 2 is made from an aluminium hollow profile, which comprises at least two hollow chambers 3. In a preferred embodiment, said profiled is obtained by extrusion. The frame 5 is fixed to the bottom plate 2. On represented FIG. 1, the frame 5 is an aluminium extrusion, with two hollow chambers. The assembly between the frame 5 and the bottom plate 2 is preferably water tight.

According to the invention, one hollow chamber of the hollow profile 3 of the bottom plate 2 is filled with a phase change material (PCM) 6-1, characterized by a temperature of melting $T1_F$, and another hollow chamber of the hollow profile 3 is filled with another PCM 6-2, characterized by a temperature of melting $T2_F$, where $T1_F > T2_F$.

FIG. 1 presents a battery box in which the thermal management by PCM is insured by the bottom plate 2. However, in another preferred embodiment, the thermal management is insured by the battery box frame, which is a hollow profile which comprises at least two hollow chambers where one hollow chamber of the hollow profile is filled with a phase change material (PCM), characterized by a temperature of melting $T1_F$, and another hollow chamber of the hollow profile is filled with another PCM, characterized by a temperature of melting $T2_F$, where $T1_F > T2_F$.

In another preferred embodiment, the bottom plate and the frame of the battery box insured the thermal management accordingly to the invention.

Figure 2:
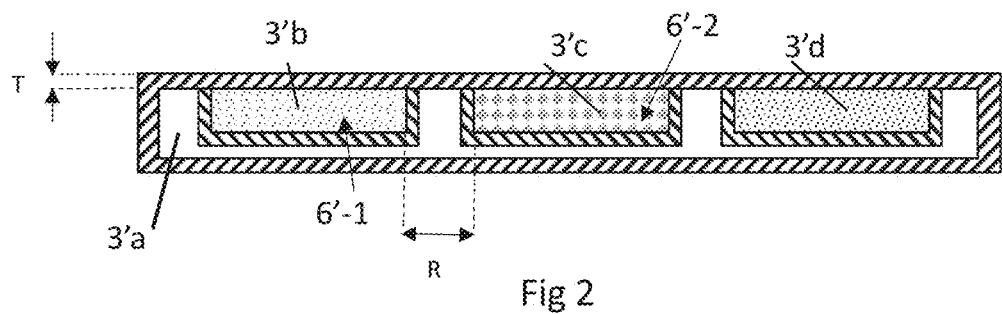
FIG. 2 represents a schema of an extrusion with four chambers: two chambers are filled with a PCMs having a melting temperature of $T1_F$ and one chamber is filled with a PCMs having a melting temperature of $T2_F$
Figure 3:
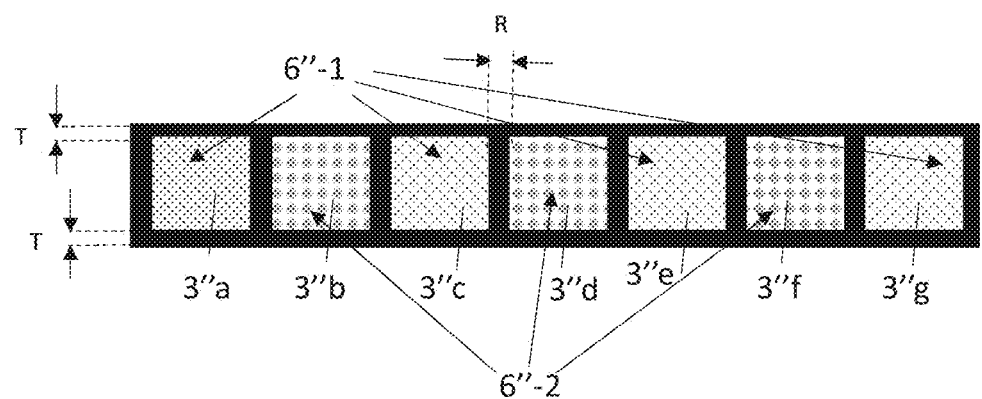
FIG. 3 represents a schema of an extrusion with 7 chambers: 4 chambers are filled with a PCMs having a melting temperature of $T1_F$ and 3 chamber is filled with a PCMs having a melting temperature of $T2_F$.

FIG. 2 and FIG. 3 correspond to cross-section of hollow extrusions which can be constitutive of the bottom plate of the battery box.

FIG. 2 represents a hollow profile with four hollow chambers ($3'a$, $3'b$, $3'c$, $3'd$). Two chambers ($3'b$, $3'd$) are filled with a PCM 6-1 having a melting temperature of $T1_F$ and one chamber $3'c$ is filled with a PCM 6'-2 having a melting temperature of $T2_F$, where $T1_F > T2_F$. Chambers $3'b$, $3'c$, $3'd$ are separated from the battery box environment by a wall with a thickness T. Each juxtaposed chambers are separated by a distance R. The distance R includes the thickness of the walls of the chambers. One chamber $3'a$ is not filled by a PCM.

FIG. 3 represents a hollow profile with seven hollow chambers ($3"a$ to $3"g$). Four chambers ($3"a$, $3"c$, $3"e$, $3"g$) are filled with a PCM 6"-1 having a melting temperature of $T1_F$ and three chambers ($3"b$, $3"d$, $3"f$) are filled with a PCM 6"-2 having a melting temperature of $T2_F$, where $T1_F > T2_F$. Chambers $3"a$ to $3"g$ are separated from the battery box environment and from the outdoor environment by a wall thickness T. Each juxtaposed chambers are separated by a distance R.

Figure 4:
FIG. 4 represents a schema of an extrusion constituted of ten chambers. The interior wall of each chamber has a corrugated pattern to maximize the developed surface area.
Figure 4A:
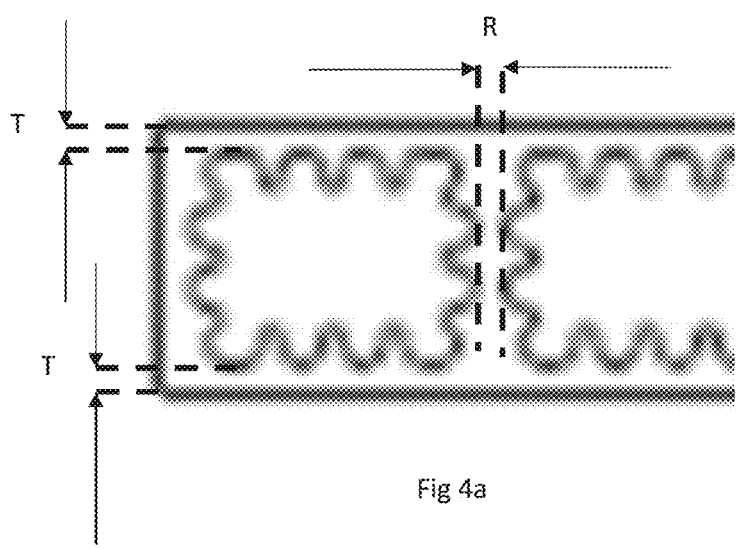
FIG. 4a is an enlargement view of the cross section of FIG. 4 representing the rib which separates two chambers and the walls which separate the chambers from the environment (either battery cells or outdoor environment)
Figure 4B:
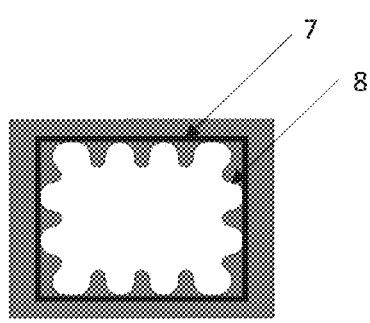
FIG. 4b is a schema representing the increase of the developed surface by inserting a corrugated pattern inside the chamber.

FIG. 4a is schema of an aluminium hollow profile with chambers presenting a corrugated pattern to increase the developed surface. In this case, the thickness T of the wall separating the chamber filled by a PCM with outdoor environment or interior of the battery box corresponds to the wall thickness of the chamber, without corrugated pattern, in which the corrugated pattern can be inscribed (cf FIG. 4b).

Similarly, the distance between two juxtaposed chambers corresponds to the distance between two chambers (without corrugated pattern) in which two juxtaposed corrugated patterns can be inscribed.

By increasing the perimeter with a corrugated pattern, the developed surface increase on the same ratio. For the example illustrated on FIG. 4c, a flat surface chamber 7 is considered and a corrugated pattern 8 is inscribed into this flat chamber. Keeping in consideration to maintain a sufficient volume of PCM and an extrudable shape, the developed surface area has been increased by a ratio of 1.33.

In a preferred embodiment (not showed), there is also of interest to add a corrugated pattern on the exterior of the profile to improve the thermal response.

The invention claimed is:

1. A battery box comprising:
   an aluminum hollow profile comprising at least first and second chambers,
   wherein said first chamber is filled with a first phase change material having a melting point temperature $T1_F$, and
   wherein said second chamber is filled with a second phase change material having a melting point temperature $T2_F$, where $T1_F > T2_F$.

2. The battery box according to claim 1, wherein the difference between $T1_F$ and $T2_F$ is at least 5° C.

3. The battery box according to claim 1, wherein $T1_F$ is between 25° C. and 70° C., and $T2_F$ is between 5° C. and 30° C.

4. The battery box according to claim 1, wherein said aluminum hollow profile comprises a third chamber.

5. The battery box according to claim 4, wherein said third chamber is filled with a third phase change material having a melting point temperature $T3_F$, where $T1_F > T3_F > T2_F$.

6. The battery box according to claim 5, where $T3_F$ is between 15° C. and 45° C.

7. The battery box according to claim 1, wherein the at least first and second chambers are filled with phase change materials.

8. The battery box according to claim 1, wherein the at least first and second chambers have a developed surface area which is at least 1.5 times greater than the surface area of a solid profile having the same geometry.

9. The battery box according to claim 1, wherein the at least first and second chambers have a developed surface area which is at least 2 times greater than the surface area of a solid profile having the same geometry.

10. The battery box according to claim 1, wherein the at least first and second chambers comprise an internal corrugated pattern.

11. The battery box according to claim 10, wherein the corrugated pattern increases the developed surface area of a chamber into which the corrugated pattern is inscribed by a ratio of at least 1.2.

12. The battery box according to claim 1, wherein the at least first and second chambers are separated from each other by a distance R of at least 1.5 mm.

13. The battery box according to claim 1, wherein at least one of the first chamber and the second chamber is separated from the battery cell environment and/or from the outdoor environment by a wall, said wall having a thickness of less than 2.5 mm.

14. The battery box according to claim 1, where the aluminum hollow profile is an extruded profile.

15. A process for manufacturing the battery box according to claim 1, comprising the following steps:

producing the aluminum hollow profile comprising the at least first and second chambers;

filling the first chamber with the first phase change material having the melting point temperature $T1_F$; and filling the second chamber with the second phase change material having the melting point temperature $T2_F$;

wherein $T1_F > T2_F$.

16. The process according to claim 15, comprising producing the aluminum hollow profile by extrusion.

* * * * *